Jan. 20, 1925.

L. J. STEELE ET AL 1,523,666

ELECTRIC ARC WELDING

Filed Jan. 14, 1922  4 Sheets-Sheet 2

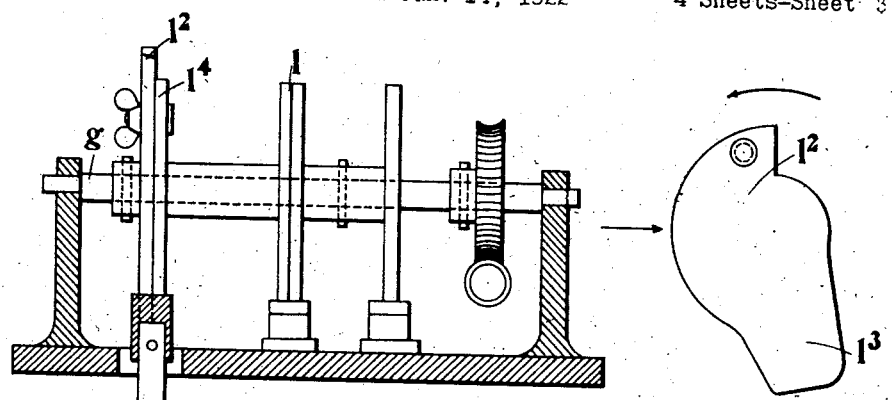
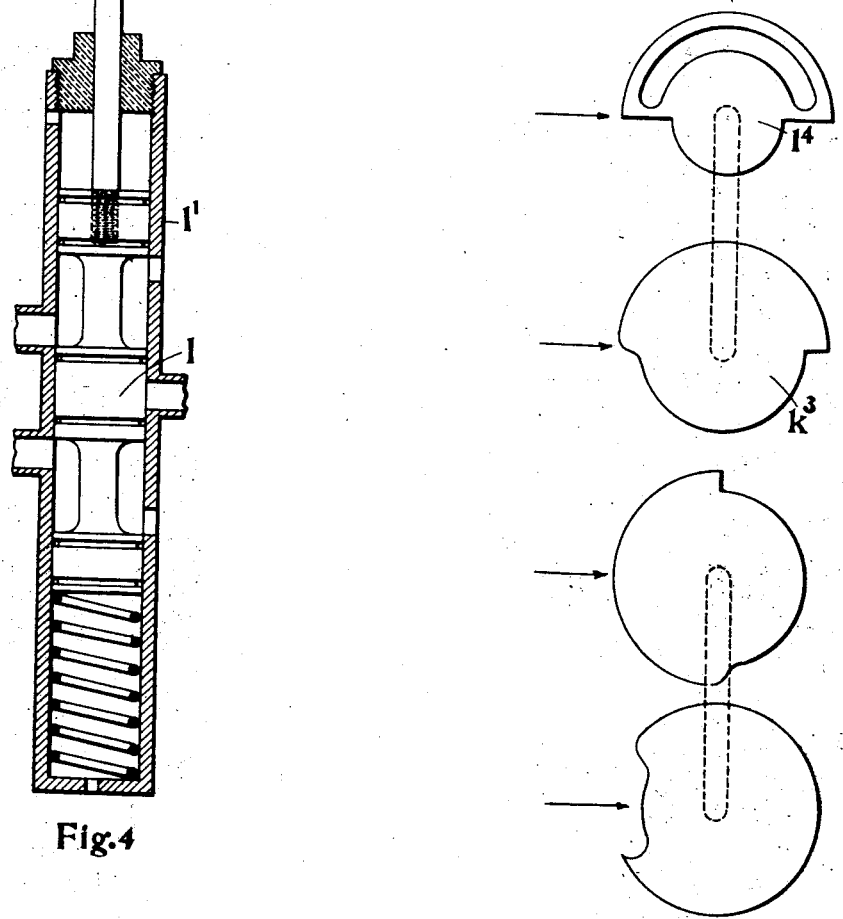
Fig.4
Fig.5

Patented Jan. 20, 1925.

1,523,666

UNITED STATES PATENT OFFICE.

LOUIS JOHN STEELE, OF PORTSMOUTH, AND HAROLD MARTIN AND ANDREW EDWARD McCARTHY, OF SOUTHSEA, ENGLAND, ASSIGNORS TO HANDSTOCK LIMITED, OF LONDON, ENGLAND, A CORPORATION OF GREAT BRITAIN AND IRELAND.

ELECTRIC-ARC WELDING.

Application filed January 14, 1922. Serial No. 529,272.

*To all whom it may concern:*

Be it known that we, LOUIS JOHN STEELE, HAROLD MARTIN, and ANDREW EDWARD McCARTHY, subjects of the King of Great Britain and Ireland, residing respectively at H. M. Dockyard, Portsmouth, in the county of Hants, England, 15 Helena Road, Southsea, in the county of Hants, England, and Lyonsdown, Haslemere Road, Southsea, in the county of Hants, England, have invented certain new and useful Improvements in and Relating to Electric-Arc Welding, of which the following is a specification.

This invention relates to apparatus for use in a process or method of electric welding with automatic timing and/or control of the arc, which process or method is especially applicable to the fitting of metal studs, tubes or the like, of iron, steel, or brass, to metal bodies, whether forged or cast, such as metal sheets, plates, bars, blocks, forgings and castings.

The process or method consists in the formation of an electric arc between the metal stud or tube or the like and the body or the like to which the stud or the like is to be welded, the maintenance of the said arc for a suitable length of time, the period of which is predetermined and automatically controlled and the subsequent forcing of the end of the molten metal stud or the like against the molten metal body or the like. For convenience of description, the stud or tube or the like is hereinafter referred to as the stud, and the metal body, plate or the like, to which the stud is to be welded, is hereinafter referred to as the plate.

According to the invention a stud moving and arc striking device is provided for operation pneumatically or by fluid pressure under the control and timing of mechanical means operating automatically. The stud holder or chuck is carried from a piston disposed within a cylinder, to which air or fluid pressure can be admitted to effect movements of the piston in either direction as required by the sequence of operations of moving the stud from the plate to strike the arc and returning the stud to the plate to effect the weld.

According to the invention, also, the admission and exhaust of the air or fluid pressure to or from the cylinder is effected by valves operated automatically by mechanical means advantageously comprising rotatable cams, the rotation of which is effected by electrically operating or electrically controlled driving mechanism.

The valves may comprise separate operating and isolating valves, the first of which serves for the admission of air or fluid pressure to either of the two sides of the piston while the second serves for cutting off or opening communication between the operating valve and the source of air or fluid pressure. The two valves, however, may be combined to form a single valve, the operating cams being modified accordingly.

According to the invention, also, the operating cams are so provided that the period during which the stud is withdrawn from the plate, and thus the duration of the arc, may be varied according to circumstances, while the closure of the main welding circuit may similarly be adjusted.

The invention broadly comprises the various features of method and apparatus as hereinafter described.

Apparatus provided in accordance with the invention is illustrated in the accompanying drawings by way of example:

Figure 4 is a sectional elevation of a modified arrangement of the controlling valves and automatic control and timing apparatus.

Figure 5 is a diagram representing the form and relative disposition of the operating cams of the automatic control and timing apparatus represented in Figure 4.

The apparatus broadly comprises two parts. The first, a stud moving and arc striking device, the second, a controlling and timing apparatus, which ensures that the period of the arc is automatically maintained at any desired predetermined value until the apparatus is re-set.

Figure 1:
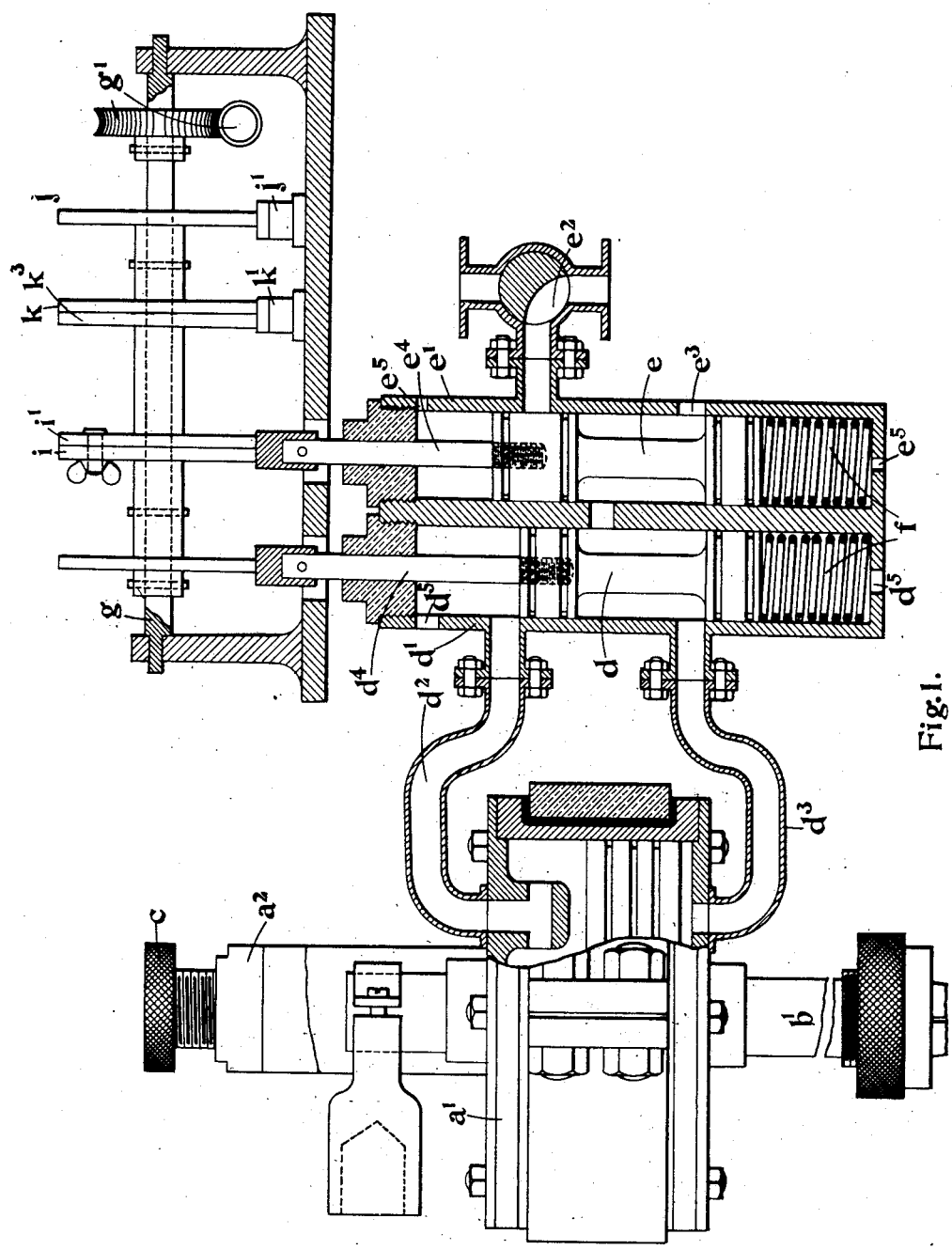
Figure 1 is an elevation partly in section of one construction of the stud moving and arc striking device.
Figure 2:
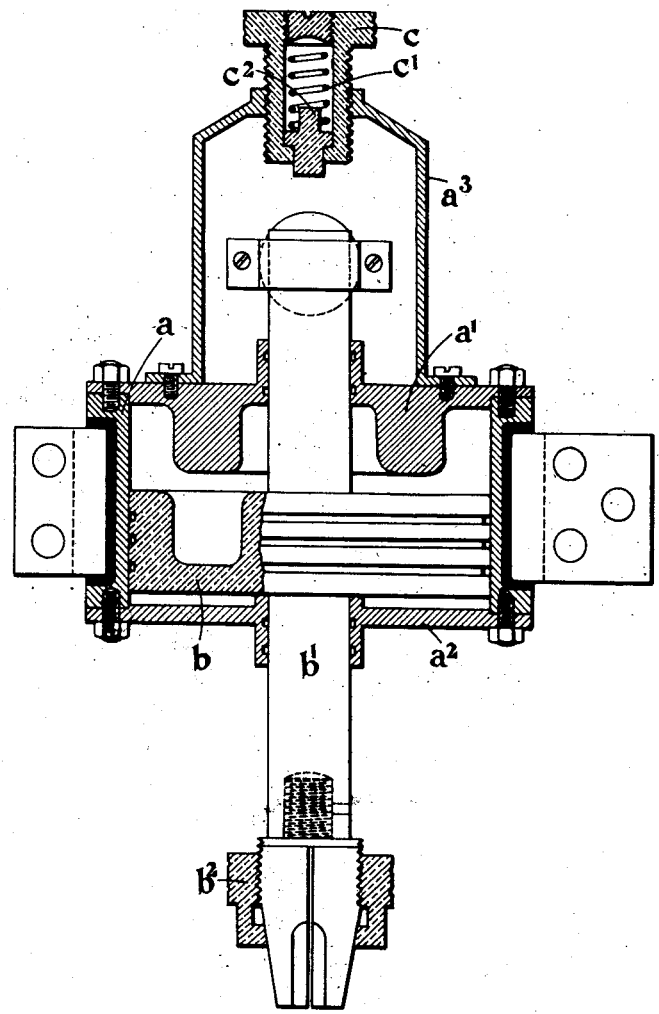
Figure 2 is a sectional elevation at right angles to Figure 1.
Figure 3:
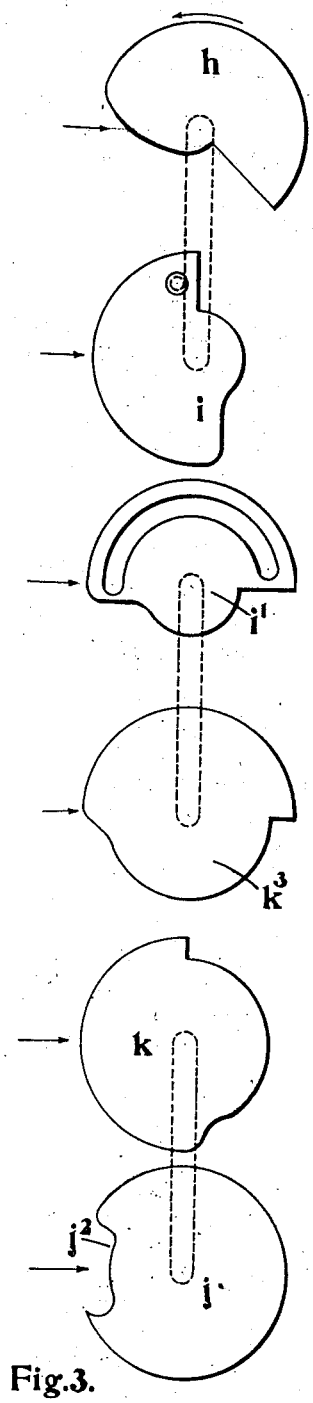
Figure 3 is a diagram representing the relative disposition and form of the operating cams of the automatic control and timing apparatus.

In the construction of the apparatus according to the invention illustrated in Figures 1 to 3 of the accompanying drawings, the stud moving and arc striking device is suitable for attachment to, though insulated from, a movable spindle or slide such as that of a drilling machine, and has rigidly connected to it the necessary control valves actuated by an automatic timing mechanism, and connected to a source of compressed air by a flexible tube or pipe.

The stud moving and arc striking device consists of a cylinder $a$ containing a piston $b$ and piston rod $b^1$, which latter passes through suitable glands in the centre of the cover plates $a^1$, $a^2$ at the upper and lower ends of the cylinder. At the lower and outer end of the piston rod $b^1$ is fitted a suitable chuck or other stud holding device $b^2$. The upper cover plate $a^1$ of the cylinder carries upon a bracket $a^3$ an adjustable arc length setting and limiting device, comprising a screwed plug $c$ with a central bore closed at the upper end and containing a spring $c^1$ pressing upon a plunger $c^2$ which protrudes from the plug to an extent determining the exact required length of arc.

The two control valves $d$, $e$, which are of the piston type, are disposed in suitable cylindrical valve casings $d^1$, $e^1$, of which the casing $d^1$ is connected by way of two ports through pipes $d^2$, $d^3$ with corresponding ports in the upper and lower cover plates of the cylinder $a$, and the casing $e^1$ is connected through a suitable port with an air supply fitting $e^2$ and provided with a second port $e^3$ for communication with the atmosphere. The valve $e$ serves as an insulating valve and functions to connect the casing $d^1$ of the other or operating valve $d$ either to the air supply for the apparatus, when in its upper position, or alternatively to atmosphere, when in its lower position. The operating valve $d$ serves, when in its lower position, to connect the space in the cylinder $a$ at the under-side of the piston $b$ with the casing $e^1$ of the isolating valve $e$, and the corresponding cylinder space at the upper side of the piston $b$ to atmosphere. Conversely, when in its upper position, the operating valve $d$ connects the cylinder space at the upper side of the piston $b$ to the casing $e^1$ of the isolating valve $e$ and the cylinder space at the under-side of the piston $b$ to atmosphere. Operating rods $d^4$, $e^4$ are fitted to and above the control valves and springs $f$ are arranged below the valves, so that both valves tend to rise to their higher positions. The casings $d^1$, $e^1$ are closed at both ends and provided with air ports $d^5$, $e^5$, the ports $d^5$ serving for the exhaust to atmosphere and the ports $e^5$ to permit free movement of the valve $e$.

The automatic control and timing apparatus comprises a rotatable spindle $g$ on which are fixed suitable cams $h$, $i$, which operate in conjunction with the rods $d^4$, $e^4$, respectively, of the control valves to permit the latter to rise under the action of the springs $f$ as necessary. The cam spindle is rotated at a constant speed through suitable gear, such as a worm and worm wheel gear $g^1$, by means of an electric motor $g^2$, or other suitable form of motor controlled electrically. To effect the sequence of operations required for a weld it is necessary that the cam spindle $g$ of the timing apparatus should make one complete revolution. The motor control circuit is therefore carried through a contact disc or cam $j$ mounted upon the spindle $g$ and having a gap $j^2$ in its periphery. The disc or cam $j$ co-operates with an insulated contact finger or brush $j^1$. When, therefore, after a complete revolution of the cam spindle $g$, the gap $j^2$ comes opposite the finger or brush $j^1$ the motor control circuit is broken and the rotation of the motor arrested. The rotation of the motor and thus of the cam spindle may be started for each weld by operation of a push button or other switch $g^3$ which completes the motor control circuit until the finger or brush $j^1$ makes contact with the disc or cam $j$. A cam $k$, also fitted on the spindle $g$, operates in conjunction with a suitably arranged spring-controlled bell-crank lever $k^1$ to close and open a switch $k^2$ in the main welding circuit.

The form of the cams $h$, $i$, $k$ is such that the movements of the valve operating rods and the bell crank lever when the valves rise and the welding circuit is closed are sudden and for this purpose the edges of the cams are at the required points formed with radial edges, the relative disposition of the radial edges of the cams $i$ and $k$ being such that the bell crank lever $k^1$ is thrown over to close the welding circuit immediately before the valve $e$ rises to place the cylinder $a$ in communication with the supply through the fitting $e^2$ by way of the pipe $d^3$. In order that the time period of the arc may be varied as desired, it is necessary to provide means whereby the movement of the valve $e$ may be effected at different points in the revolution of the cam spindle $g$. For this purpose the cam $i$ is duplicated by a cam $i^1$ which is loosely mounted upon the spindle $g$ and disposed in contact with the cam $i$ to which it is adjustably secured by means of a stud and thumb screw carried by the cam $i$ and engaging in a slot in the cam $i^1$ concentric to the axis of the spindle. It is also necessary that the moment of the closing of the welding circuit should be varied accordingly. For this purpose the cam $k$ is similarly duplicated by a cam $k^3$ which is mounted loosely upon the spindle $g$ and in fixed relation to the cam $i^1$ to which it may be secured by a sleeve fitting upon the spindle. Any adjustment of the cam $i^1$ with reference to the cam $i$ therefore involves corresponding adjustment of the cam $k^3$ to the cam $k$, thus ensuring that the closure of the main welding circuit takes place at the right instant relatively to the striking of the arc.

It will be understood that variations may be made in the construction and arrangement of the apparatus hereinbefore described without departing from the invention. Thus it is not essential that the automatic control and timing apparatus should be rigidly fitted to the stud moving and arc striking device, as connection for the transmission of the pneumatic or fluid pressure may be made between the apparatus and the device by means of flexible tubes. Again the controlling valves and operating cams may be so provided that the movement of the valves may be effected entirely by the cams or that the lifting of the valves may be effected by the cams and the return movement effected by spring action.

As illustrated in Figures 4 and 5 the isolating and operating valves may be combined as a single or double valve $l$ disposed in a corresponding valve casing $l^1$ and the cams $h$ and $i$ are replaced by a compound cam $l^2$ serving first to permit the valve to rise in order to admit the pneumatic or fluid pressure into the cylinder $a$ below the lower face of the piston $b$ and then to depress the valve past its initial position until communication is opened between the source of pneumatic or fluid pressure and the upper space of the cylinder $a$. The cam $l^2$ for this purpose is formed with a portion $l^3$ which projects beyond the circumferential line corresponding to the initial position of the valve. In order to permit adjustment of the time period of the arc the same means as that described with reference to Figures 1 to 3 may be provided, that is, a cam $l^4$ is mounted loosely upon the spindle $g$ in contact with the cam $l^2$ to which it is secured in its adjusted position by means of a stud and slot connection. The cam $l^4$ is, as before, rigidly connected with the cam $k^3$.

Figure 6:
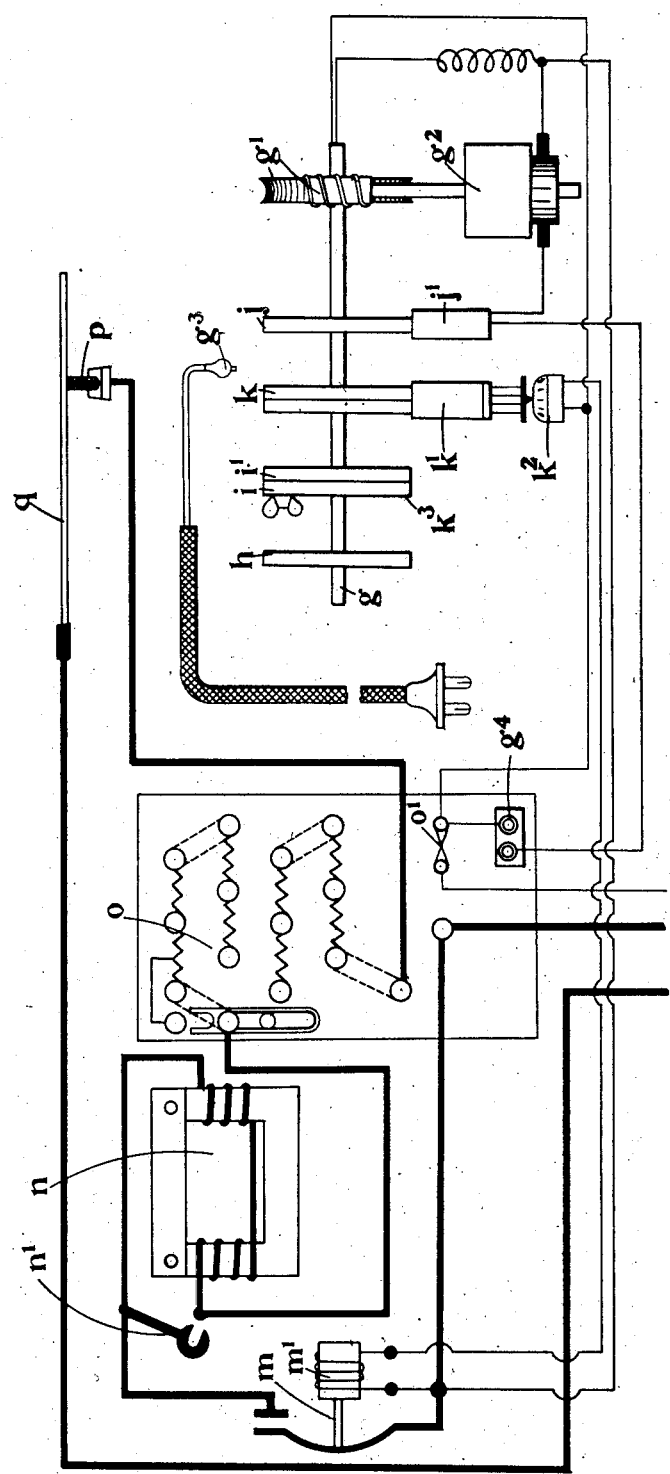
Figure 6 is a diagram of the electrical connections for the construction of apparatus illustrated in Figures 1 to 3.

Referring to Figure 6 it will be seen that an electro-magnetically actuated contactor $m$, reactance coil $n$, and adjustable rheostat $o$ are included in the main welding circuit in series with the stud $p$ and plate $q$ while in a parallel or control circuit is inserted the operating coil $m^1$ of the contactor in series with the switch $k^2$ and a fuse $o^1$. Similarly a motor circuit is provided in parallel to the said control circuit passing through the motor $g^2$ and the contact finger $j^1$ and thence by way of the cam $j$ and the spindle $g$ to the fuse $o^1$, the field of the motor being in shunt across the motor armature and the spindle $g$. To permit the starting of the motor, when the contact finger $j^1$ is opposite the gap $j^2$ of the cam $j$, the press button switch $q^3$ is provided, with plug contacts for introduction into plug sockets $g^4$ which are in circuit between the fuse $o^1$ and the contact finger $j^1$. The reactance coil $n$ serves to prevent the sticking of the stud $p$ to the plate $q$ and thus facilitates the drawing of the arc by delaying the otherwise extremely rapid rise in the value of the current of the main or welding circuit when the main switch or contactor is closed with the stud in contact with the plate and with a sufficiently low resistance in circuit to enable the requisite welding current to flow after the arc is struck. Apart from these effects the reactance coil is of value generally in resisting rapid fluctuations in both the current and the voltage of the arc. Means may be provided such as a switch $n^1$ for short circuiting the reactance coil when desirable.

In operation, after the stud $p$ has been inserted in the stud holder or chuck $b^2$ the stud moving device is placed so that the stud is held in correct position against the plate $q$, the stud moving device being then clamped or locked in position. The arc striking and limiting device is then adjusted, and assuming that necessary adjustments of the rheostat and timing apparatus have been made to regulate both the current and time period of the arc, the automatic timing and control apparatus is now started by means of the push button or switch $q^3$ which closes the motor circuit, setting the motor in operation to rotate the spindle $g$. The closure of the motor circuit is then maintained by the cam plate $j$. During the ensuing rotation of the cam spindle $g$ of the control apparatus the following sequence of operations takes place:—

1. The contactor operating coil circuit is closed at the switch $k^2$ by the cam $k$, through the lever $k^1$, thereby closing the main circuit through the stud $p$ and plate $q$ by means of the contactor $n$.

2. The isolating valve $c$ rises, thereby admitting compressed air to the cylinder $a$ at the under-side of the piston $b$ carrying the stud holder or chuck $b^2$ and stud, which therefore is moved away from the plate thus striking an arc.

3. The operating valve $d$ lifts, thus connecting the cylinder space at the under-side of the piston $b$ to atmosphere and the cylinder space at the upper side of piston to the supply of compressed air which thereby forces the molten end of the stud $e$ into or on to the molten plate $q$ to which it becomes welded.

4. The contactor control circuit is now opened by the action of the cam $k$ upon the lever $k^1$ and switch $k^2$ thereby opening the main welding circuit through the stud and plate.

5. The isolating valve $e$ is now depressed by the cam $i$ thereby connecting the operating valve casing and the cylinder of the stud-moving device to atmosphere.

6. The operating control valve $d$ is depressed by the cam $h$ to the normal position.

7. The circuit of the motor $g^2$ is opened when the gap $j^2$ in the cam $j$ comes opposite the contact finger $j^1$, thereby stopping the apparatus, after one complete revolution, in the same position at which it started.

The stud-moving device is next released and withdrawn from the stud which has been welded to the plate.

An air receiver is advantageously provided between the air supply main and the welding appartus and is provided with pressure gauge in regulating cocks and valves in order that the air pressure in the stud moving apparatus may be adjusted to suit the size and nature of the weld which is being made, with due regard to the area of the stud moving piston. The mechanical pressure required to make satisfactory welds increases generally in proportion to the cross-sectional area of the stud which is to be welded, and is much greater for metals such as steel and iron than for metals with lower melting points such as brass or aluminium. The force required to complete the weld is much greater than that necesary to move the stud away from the plate and strike the arc, and on this account the stud may be moved away from the plate by means of a small auxiliary piston and cylinder on the underside of the main piston and cylinder, or alternatively, if so desired, a reduced pressure relief valve may be fitted in the cylinder at the under-side of the main piston. The automatic control and timing apparatus may be started and/or actuated by electrical, mechanical pneumatic or hydraulic means, or any desired combination thereof. The movements of the stud may also be effected by pneumatic, hydraulic, mechanical, electrical or electro-magnetic means or any combination thereof.

The use of pneumatic pressure to return the stud to the plate ensures the weld being made under adequate pressure without hammering. This may be most conveniently and simply done by the control of the pressure fluid, as, for example, by admitting it into the cylinder through an orifice of small dimensions, so that thus the piston is subjected to the full pressure only in the later part of its stroke. It is, however, necessary that excessive pressure should not be used, as otherwise an ineffective and brittle weld would result.

For the purpose of welding long bars or tubes and the like, it may be necessary to pass these through the centre of the stud-moving device, and in such cases the stud-moving device is preferably provided with a hollow piston rod at the end of which is attached the stud holder. As the use of such a hollow piston rod involves modifications in the design of either of the types of stud-moving device described, such as the provision of additional glands and an alteration in the arrangement of the arc-striking and limiting device, alternative arrangements have to be adopted. These arrangements require:—

(a) The stud holder to be fixed at the end of a hollow circular rod, the latter being free to slide in a suitable guide or guides and the necessary movements of the stud being effected by mechanically connecting the outer end of the piston rod of a stud-moving device such as either of those described by means of a suitable lever or levers and accessories to the aforementioned hollow rod to which the stud welder is attached.

(b) A hollow rod carrying a stud holder and sliding in guides similar to that in (a) may be fitted with a cross bar at either end of which is attached the piston rod of a stud-moving device such as those previously described, which in this case would be required to operate in pairs in parallel.

To facilitate welding by the method or means of this invention, more particularly when steel and iron studs have to be welded, brass rings or bushes may be fitted at the welding ends of the studs with a short length of the stud projecting. In use these rings appear to steady the arc, enlarge the crater of molten metal and generally facilitate the making of welds, which are free from blow-holes or other defects, especially with small studs. The welding of small studs can also be facilitated by making them hollow, that is, in the form of thick tubes either throughout their length or simply adjacent to the weld. Though a smaller cross sectional area of metal is obviously thus obtained at the weld, this is compensated for by the quality of the weld and the greater facility with which it is made.

The insertion of a small disc or ball of brass or other suitable metal between the stud and plate immediately before making a weld, particularly in the case of steel stud welding, is advantageous to prevent any tendency of the stud to become tacked to the plate when the welding circuit is first closed. At the same time the use of a disc or ball in this manner renders it possible to vary the quality of the weld, if necessary, by making additions of metal or other substances to it.

It will be understood that the invention is hereinbefore described in terms involving reference to actual constructional embodiments of the invention and that the invention is not limited thereto.

The mechanical automatic control and timing apparatus hereinbefore described may, for example, be operated by a clockwork or other motor adapted to drive the cam spindle direct or through suitable gearing, the operation being controlled by such means as a solenoid brake, a mechanically operated stop device or by other suitable means. Such apparatus also may be employed with a mechanically operating stud-moving and arc-striking device wherein the stud holder may be withdrawn for striking the arc by lever mechanism or by cam mechanism which may operate against spring action serving to return the stud to effect the weld, and actuated by suitable motor or other driving means under the control of the automatic timing apparatus.

The invention is applicable to the production and manufacture of cinematograph reels, parts of motor road vehicles, ferrules for umbrellas and sticks, fishing or other reels, parts of aeroplanes, parts and terminals of electrical apparatus, as well as for numerous applications to ships and other general purposes in the arts.

We claim:

1. A method of electrically welding metallic studs and the like to metallic bodies wherein the stud is moved through the path of an electric arc formed between the metallic body and the stud or the like into contact with the metallic body so as to effect the welding of the stud thereto, in which the sequence and duration of the operations involved in the welding are controlled by non-electrical means, operating automatically, substantially as described.

2. A method of electrically welding metallic studs and the like to metallic bodies wherein the stud is moved through the path of an electric arc formed between the metallic body and the stud or the like into contact with the metallic body so as to effect the welding of the stud thereto, in which the sequence and duration of the operations involved in the welding are controlled by mechanical means operating automatically, substantially as described.

3. A method of electrically welding metallic studs and the like to metallic bodies wherein the stud is moved through the path of an electric arc formed between the metallic body and the stud or the like into contact with the metallic body so as to effect the welding of the stud thereto, in which the arc is maintained for a determined period under the control of non-electrical means operating automatically, substantially as described.

4. A method of electrically welding metallic studs and the like to metallic bodies wherein the stud is moved through the path of an electric arc formed between the metallic body and the stud or the like into contact with the metallic body so as to effect the welding of the stud thereto, in which the welding current is maintained until the weld is effected, substantially as described.

5. An apparatus for electrically welding metallic studs and the like to metallic bodies wherein the stud is moved through the path of an electric arc formed between the metallic body and the stud or the like into contact with the metallic body so as to effect the welding of the stud thereto, having mechanical means for effecting the necessary movements of the stud holder, substantially as described.

6. Apparatus for use in the process of electric welding as hereinbefore described, wherein the stud is forced into contact with the body to which it is to be welded by means acting under fluid pressure.

7. Apparatus for electric welding, as set forth in claim 6, wherein the stud is withdrawn from the body to which it is to be welded for striking the arc and is returned into position for welding by means acting under fluid pressure, and under non-electrical control.

8. Apparatus for electric welding, as set forth in claim 7, wherein the control of the means acting under fluid pressure for moving the stud is effected mechanically.

9. Apparatus for electric welding, as set forth in claim 8, wherein the duration of the arc and the continuance of the closure of the welding circuit are adjustably determined.

10. Apparatus for electric welding, as set forth in claim 7, wherein the stud moving and arc striking device comprises a cylinder and piston arrangement adapted to effect the movement of a stud holder, the admission of pneumatic or fluid pressure to the cylinder being controlled by non-electrically operated valves.

11. Apparatus for electric welding, as set forth in claim 10, wherein the valves are operated through cams mounted upon a rotatable shaft.

12. Apparatus for electric welding, as set forth in claim 7, wherein the welding circuit is closed by means of a mechanically operated switch under control of a rotatable cam device.

13. Apparatus for electric welding, as set forth in claim 11, wherein a cam with adjustable valve-operating surface is provided to determine the moment of the admission of pneumatic or fluid pressure to the stud moving and arc striking device.

14. Apparatus for electric welding, as set forth in claim 12, wherein the switch of the welding circuit is closed by a cam having an adjustable operating surface.

15. Apparatus for electric welding, as set forth in claim 11, wherein the cams are rotated by means of a motor under electrical control through a rotatable cam and contact device, the cam being provided with a gapped surface to determine the rotation of the motor.

16. Apparatus for electric welding, as set forth in the preceding claim, wherein the motor may be set into rotation by a switch device adapted for operation until the controlling cam becomes operative.

17. Apparatus for electric welding, provided with a mechanically operating control device for controlling the sequence and duration of the operations involved in the welding and comprising rotatable cams, the said cams being provided as pairs of elements whose relative position is capable of adjustment, substantially as hereinbefore described.

18. Apparatus for electric welding, as set forth in claim 10, wherein the admission and exhaust of pneumatic or fluid pressure with respect to both faces of the piston of the stud moving and arc striking device are effected under the control of two valves, one of which serves to control the supply of pneumatic or fluid pressure and the other the passage of pneumatic or fluid pressure to the respective faces of the piston, the valves being operated automatically by mechanical means.

19. Apparatus for electric welding, as set forth in claim 10, wherein the admission and exhaust of pneumatic or fluid pressure with reference to the cylinder of the stud-moving and arc striking device is controlled by a single valve operated automatically by mechanical means.

20. Apparatus for electric welding, as set forth in claim 18, wherein the valves are operated in one direction by cams and in the other direction by spring action.

21. Apparatus for electric welding, as set forth in claim 19, wherein the single valve is operated in one direction by a cam and in the other direction by spring action.

LOUIS JOHN STEELE.
HAROLD MARTIN.
ANDREW EDWARD McCARTHY.